(12) United States Patent
Ogawa

(10) Patent No.: US 7,703,342 B2
(45) Date of Patent: Apr. 27, 2010

(54) PRESSURE DISTRIBUTION DETECTION DEVICE

(75) Inventor: Yasuji Ogawa, Tsukuba (JP)

(73) Assignee: Xiroku, Inc. (JP)

( * ) Notice: Subject to any disclaimer, the term of this patent is extended or adjusted under 35 U.S.C. 154(b) by 141 days.

(21) Appl. No.: 11/887,556

(22) PCT Filed: Mar. 26, 2006

(86) PCT No.: PCT/JP2006/306432

§ 371 (c)(1),
(2), (4) Date: Jan. 17, 2008

(87) PCT Pub. No.: WO2006/106714

PCT Pub. Date: Oct. 12, 2006

(65) Prior Publication Data

US 2009/0078059 A1    Mar. 26, 2009

(30) Foreign Application Priority Data

Mar. 30, 2005  (JP) .............................. 2005-096580

(51) Int. Cl.
G01D 7/00  (2006.01)
(52) U.S. Cl. .............................................. 73/862.046
(58) Field of Classification Search ............. 73/862.46, 73/862.625, 862.69
See application file for complete search history.

(56) References Cited

U.S. PATENT DOCUMENTS 6,914,427 B2 * 7/2005 Gifford et al. ............... 324/242

FOREIGN PATENT DOCUMENTS

JP    2005-156474    6/2005

* cited by examiner

*Primary Examiner*—Lisa M Caputo
*Assistant Examiner*—Octavia Davis
(74) *Attorney, Agent, or Firm*—Wells St. John P.S.

(57) ABSTRACT

There is provided such a pressure distribution detection device that noise affect is small even when the detection region is increased and no line break occurs even when the device is used for a long period of time. The pressure distribution device detects distribution of the pressure applied. The device includes a first loop electrode line group (1), a second loop electrode line group (2) arranged on the first loop electrode line group (1), an elastic body (3) arranged on the second loop electrode line group (2), and a conductive material (4) arranged on the elastic body (3). The first loop electrode lines (1) are arranged in parallel to one another inside a first surface. The second loop electrode line (2) are arranged in parallel to one another within a second surface parallel to the first surface and fixed at a predetermined distance from the first surface. The second loop electrode lines (2) orthogonally intersect the first loop electrode line (1). The conductive material (4) is movably arranged via the elastic body (3) on the intersection between the first loop electrode line (1) and the second loop electrode line (2). The first loop electrode lines (1) are driven by a drive circuit and a detection circuit detects a signal electromagnetically coupled from the second loop electrode lines (2).

18 Claims, 4 Drawing Sheets

PRESSURE DISTRIBUTION DETECTION DEVICE

CROSS REFERENCE TO RELATED APPLICATION

This is a 35 U.S.C. §371 application of and claims priority to POT International Application Number PCT/JP2006/306432, which was filed Mar. 29, 2006, and which claims priority to Japanese Patent Application No. 2005-096580, filed Mar. 30, 2005, and the teachings of all the applications are incorporated herein by reference.

FIELD OF INVENTION

The present invention relates to a pressure distribution detection device, particularly to a pressure distribution detection device which detects distribution of applied pressure by means of signals generated by electromagnetic coupling in the detection device in which the distances between loop electrode lines are fixed.

PRIOR ART

Various types of devices that detect pressure distribution by means of a material in the form of a thin sheet have been developed in the past. Such devices include, for example, those ones which employ various mode of operation, such as using pressure-sensitive rubber, electrostatic coupling, electromagnetic coupling and the like. For example, a pressure distribution detection device employing pressure sensitive rubber is disclosed in Japanese Patent Laid-open No. 57-100331. The method disclosed in this reference is to determine pressure distribution, for example, by placing a sheet-like pressure detection device made from pressure-sensitive rubber sheet, when performance evaluation test for an automotive seat is carried out. In addition, a detection device to be used for similar purpose that employs electrostatic coupling is disclosed in, for example, Japanese Patent Laid-open No. 62-226030. The detection device according to this reference includes a sensor configured in the form of a sheet for determining pressure distribution.

Furthermore, a pressure-sensitive sensor workable by means of electromagnetic coupling is disclosed in Japanese Utility Model Laid-open No. 62-31865. Japanese Patent Application No. 2003-398299, which has been filed by the applicant of the present patent application, discloses as well a pressure detection device workable by means of electromagnetic coupling. The sensor based on electromagnetic coupling as disclosed in the above reference is configured so as to detect changes in signals based on changes in the distance between coils.

Reference 1: Japanese Patent Laid-open No. 57-100331
Reference 2: Japanese Patent Laid-open No. 62-226030
Reference 3: Japanese Utility Model Laid-open

DISCLOSURE OF THE INVENTION

Object to be Achieved by the Invention

However, for pressure detection device which employs pressure-sensitive rubber and electromagnetic coupling, it has been difficult to make sensors into large sizes because such pressure detection devices have relatively high impedance and less resistant to noises. Such an influence due to noises is not problematic if the size of the sensor is as large as it is used for performance evaluation tests for automotive seats, but it has been difficult to determine pressure distribution in such a case of, for example, bedding a pressure distribution detection device over the floor of a shop for surveying the behavior of visitors and using the sensor for security purpose, because the sensor is greatly affected by noises.

In case of a pressure distribution detection device using electromagnetic coupling, hardness of an electrode itself interferes detection of minute pressure, which thus makes accurate detection of pressure difficult. Moreover, breaks of electrodes and/or wirings happen to be caused with use of the detector, because pressure to be determined is directly applied to the electrode itself.

Taking the above-described circumstances into consideration, the present invention is to provide a pressure distribution detection device which causes less noise even extending a region for the detection and does not cause breaks of electrode lines even after using them for a long time.

Means for Achieving the Object

In order to achieve the object of the present invention, the pressure distribution detection device according to the present invention comprises first loop electrode line group consisting of a plurality of loop electrode lines and arranged in parallel in a first surface, second loop electrode line group consisting of a plurality of loop electrode lines and arranged in parallel in the direction orthogonal to the first loop electrode line group in a second surface, a distance of which to the first surface is fixed so as to be in parallel thereto on the first surface, an elastic body arranged on the second surface, conductive members movably arranged via the elastic body at least on the intersections formed by the first and second loop electrode line groups, and a controller for separating either one of the first loop electrode line group and the second loop electrode line group and detecting signals generated by electromagnetic coupling from the other loop electrode line group.

In this pressure distribution detection device, it is enough to provide a conductive member onto the intersection formed by the first loop electrode line and the respective second loop electrode line, respectively.

The shape of the conductive member may be any of square-shaped, round-shaped or ring-like.

Alternatively, the conductive member may be provided in the form of strip along the respective loop electrode lines of the loop electrode line group located at the detection side among the first and second loop electrode line groups.

For the controller, an oscillator and a constant-current drive amplifier having an output impedance of approximately zero may included at the drive side.

Furthermore, it is also possible to provide the detection device with one or more constant-current drive amplifiers, and those amplifiers may be connected to one or more loop electrode lines of the loop electrode line group located at the drive side among the first and second loop electrode line groups.

In this case, a current amplifier, the output impedance of which at the detection side is approximately zero, may be used as the controller.

Still further, the pressure distribution detection device according to this invention may be configured such that one or more current amplifiers are provided, and those current amplifiers are connected to one or more loop electrode lines of the loop electrode line group located at the detection side among the first and second loop electrode line groups.

In this case, a sheet made of silicon sponge may be used for forming the elastic member.

Further, a magnetic shield material may be provided under the first surface or onto the conductive members.

In this case, the respective electrode lines other than the loop electrode lines to those which the controller is connected may be simply opened.

Further, it is useful to include a switch for connecting the controller to two or more loop electrode lines in turn in the detection device.

Further, the controller may be configured such that it drives two or more loop electrode lines by using different waveforms.

In this case, the controller may include therein a plurality of filter circuits for respectively separating the detected waveforms.

In addition, it is also possible to configure the first and second surfaces into curved surfaces.

Alternatively, the detection device may be configured such that the elastic body and the conductive members acquire permeable property and the detection device includes a display device in the space in between the second loop electrode line group and the elastic body.

ADVANTAGEOUS EFFECT OF THE INVENTION

The pressure distribution detection device according to the present invention has an advantage capable of rendering the detection range wider since it is resistant to influence caused by noises. In addition, the electrodes themselves are highly durable since they are fixed and are not movable. Further, the detection device is configured in a simple structure and can be manufactured easily since no wiring is required for the movable conductive members. Moreover, the pressure distribution detection device formed not only into planar but also into various shapes can be realized.

BEST MODE FOR CARRYING OUT THE INVENTION

Now, the best mode for carrying out the present invention will be explained in the following with reference to the appended drawings. FIG. 1 includes a schematic top view for explaining the first embodiment of the pressure distribution detection device according to the present invention and a block diagram for the drive circuit and the detection circuit. FIG. 2 is a schematic lateral cross section of the pressure distribution detection device shown in FIG. 1 cut along the broken line A-A. As can be seen from FIG. 2, in the sensor section, a plurality of first loop electrode lines 1 and a plurality of second loop electrode lines 2 are arranged at the underside and the upper side of the device, respectively, with a predetermined distance therebetween. More specifically, a plurality of first loop electrode line 1 are arranged in parallel within one surface, and a plurality of second loop electrode line 2 are arranged in parallel in a surface which is different from the surface in which the first loop electrode lines 1 are arranged and is in parallel to the later surface. The region resulted in between the first loop electrode lines 1 and the second loop electrode lines 2 is fixed with a predetermined distance. Note that, as can be seen from FIG. 1, the first loop electrode lines 1 and the second loop electrode lines 2 are arranged such that they cross orthogonally to each other and are superimposed in a matrix structure. It should be noted that one end of the respective loop electrode lines is grounded. Though a sheet of silicon sponge is used for the material of the elastic body 3 in this example, the material is not limited to this, and it is possible to use various different materials as far as it is an elastic member provided with electrically-insulating property. Then, over the elastic body 3, conductive members are provided. As can be seen from FIG. 1, the conductive members 4 are provided onto the respective intersections formed respectively by the first loop electrode lines 1 and the second loop electrode lines 2. Note that the conductive members 4 may be made of various materials having conductive property, such as aluminum foil and copper foil. The conductive members 4 can be formed onto the elastic body 3 with use of such a metal foil by means of hot stamping method, printing with conductive ink, or the like.

Note that, since the resolution for pressure distribution detection depends on the installation density of the loop electrode lines, it is possible to improve the resolution by increasing the installation density of the loop electrode lines and forming the conductive members at least onto the intersections of the loop electrode lines. The formation of the conductive members can be realized easily by employing a microscopic processing technique such as etching.

The sensor section is connected to the controller. The controller comprises a drive circuit, a detection circuit, MPU or the like. A drive circuit is connected to the first loop electrode lines 1, and a detection circuit is connected to the second loop electrode lines 2. The drive circuit comprises e.g. an oscillator 12 and a constant-current drive amplifier 5, wherein the first loop electrode lines 1 are connected in turn to the drive circuit via the switching section 6 so that the loop electrode lines 1 are driven. The detection circuit comprises e.g. a current amplifier 7, a synchronous detector 8 and AD conversion section 9 and is connected in turn to the second loop electrode lines via the switching section 10. Note that, in this specification, it is explained that the first loop electrode lines are arranged at the drive side and the second loop electrode line are arranged at the detection side. However, the present invention is not limited to such a configuration, and it is naturally possible to inversely arrange the first loop electrode lines 1 at the detection side and the second loop electrode lines 2 at the drive side.

To the switching section 6, 10, an MPU 11 for controlling the switching section is connected. The MPU 11 receives signals detected by the detection circuit to perform processing such as pressure measurement.

One end of the respective loop electrode lines is connected to the drive circuit or the detection circuit via the switching section 6 or 10, and the other end is grounded. The loop electrode lines, those which are not connected to the drive circuit or the detection circuit, come to the open state in order not to affect the other loop electrode lines. Note that the switching section 6 or 10 may comprise a multiplexer or the like. The switching section is connected to the respective loop electrode lines in the manner as described above.

Besides, it is preferable to render the output impedance of the constant-current drive amplifier 5 to high impedance of approximately limitless. Further, the detection device is configured such that the input impedance of the current amplifier 7 in the detection circuit is approximately zero, one input terminal of the current amplifier is grounded, the output from the second loop electrode line 2 is directly input to the other terminal, and a feedback resistance is also connected to the other terminal. Current amplified in the current amplifier 7 is input to the synchronous detector 8. The output from the oscillator 12 is also connected to the synchronous detector 8. Then, the output from the oscillator 12 and signals generated by electromagnetic coupling are synchronized, then being converted in the AD conversion section 9. The converted is then input to the MPU 11 and processed there in accordance with necessity for pressure distribution detection.

Normally, no current flows into the second loop electrode lines 2 even if the first loop electrode lines 1 are driven since the bonding between the electrode lines being orthogonal to each other is very weak. However, because of that the conductive members 4 are formed onto the orthogonal parts in the pressure distribution detection device according to the present invention, bonding is established between loop electrode lines intersecting to each other, which causes current flow into the second loop electrode lines 2 since eddy current flows into the conductive members 4 and magnetic field is generated in the direction perpendicular to the exciting direction too. The degree of this bonding is changed depending on the distance between the conductive member 4 and the second loop electrode line 2. Accordingly, it is possible to apply load onto the pressure distribution detection section to thereby detect the amount of change corresponding to the moving distance of the conductive member 4 as current values. As described above, since the distance between the opposing loop electrode lines does not change, respectively, but the magnitude of the bonding between the loop electrode lines changes depending on the movement of the conductive member provided in the vicinity of the intersection, it is possible to detect pressure applied onto the pressure distribution detection section based on the amount of the change.

With the pressure distribution detection device configured as described above, a procedure for determining pressure will be explained in the following. In the first step, a constant-current drive amplifier 5 is connected to one of the first loop electrode lines 1 via the switching section 6. On the other hand, the second loop electrode lines 2 are connected in turn to the current amplifier 7 via the switching section 10. When all of the second loop electrode lines 2 were connected in turn to the current amplifier 7, the connection of the constant-current drive amplifier 5 via the switching section 6 is then switched so as to connect to a loop electrode line that is next to the loop electrode line having been connected. Then, the second loop electrode lines 2 are connected again in turn to the amplifier. By repeating this procedure, all of the loop electrode lines are connected in turn to the drive circuit or the detection circuit.

When AD current is applied to the first loop electrode lines 1, eddy current flows into the conductive members 4 and magnetic field is also generated in the direction perpendicular to the exciting direction, whereby current flows into the second loop electrode lines 2 in the direction of counteracting said magnetic field. This induction current changes depending on the distance between the second loop electrode line 2 and the conductive member 4. When pressure is applied to the pressure distribution detection surface, the conductive members 4 are pushed down toward the second loop electrode line side because the elastic body 3 is located in between the conductive member and the second loop electrode line. Owing to such an arrangement, the magnitude of electromagnetic coupling changes, leading current from the second loop electrode lines to change. Detection of such changes from the loop electrode lines arranged in matrix structure makes possible to determine the part of the loop electrode line where signals generated by electromagnetic coupling have been changed.

Though the shape of the conductive member shown in FIG. 2 is square, the present invention is not limited to this shape, and various shapes including round and ring-like may be applied as far as it can generate eddy current.

In addition, for aiming at eliminating impact and noise from the surrounding, enhancing detection voltage and so on, a magnetic shield material may be provided in the surface side of the first loop electrode lines 1, which is opposite to the side of the second loop electrode line 2. Alternatively, the magnetic shield material may be provided in the surface side of the conductive member 4 which is opposite to the side of the elastic body 3. Note that a silicon steel plate, a permalloy plate or the like can be used as the magnetic shield material.

As configured as described above, since the pressure distribution detection device according to the present invention uses the conductive members comprising a thin film or the like for the movable sections, it is possible to detect minute pressure with high accuracy because the detection device is not affected by the weight of the movable sections. Moreover, since the loop electrode lines themselves are fixed, it is possible to reduce stress against the electrode lines and to lower the rate of breakdown due to disconnection, short circuit, and the like. Furthermore, since it is possible to generate magnetic field in the direction perpendicular to the exciting direction due to eddy current generated in the conductive members and to detect the changes in the distance of the conductive members as great changes in the induction current by means of the loop electrode lines at the detection side, the pressure distribution detection device that is resistant to noise and capable of detecting pressure with high accuracy. Still further, manufacturing of the pressure distribution detection device can be made easily and at lower cost because wirings to the movable sections becomes needless, the installation of the loop electrode lines in coil state or the like is not required and the loop electrode lines can be installed in linear arrangements. Again, since the device is resistant to noise because the impedance of the loop electrode lines locating at the detection side is low, it is also possible to manufacture the detection surface in a very large size.

Moreover, the sensitivity of the pressure distribution detection device according to the present invention is very high. Specifically, when representing electromagnetic coupling between the first loop electrode lines 1 at the driving side and the conductive members 4 as M1 and electromagnetic coupling between the conductive members 4 and the second loop electrode lines 2 as M2, the electromagnetic coupling between the first loop electrode lines 1 and the second loop electrode lines 2 is given as M1×M2. Since M1 and M2 change in accordance with the distance between the respective loop electrode lines and the conductive members, the change in the induction current detectable with the second loop electrode lines 2 at the detection side appears as square of change in distance. As described hereinabove, it is possible to detect changes in the movement of the conductive members with excellently high accuracy with the pressure distribution detection device according to the present invention.

In the first embodiment of the pressure distribution detection device, where so many points of pressure detection exist, the method of switching loop electrode lines one by one requires much time for determining entire distribution in the detection surface. Yet, longer the measuring time performed by the measuring circuit, higher the accuracy of the measurements, and it is therefore required to spend more time.

Thus, another pressure distribution detection device by which time for measurements can be reduced and high speed operation is realized will be explained in the following. Now, the second embodiment of the pressure distribution detection device according to the present invention is explained with reference to FIG. 3. In this drawing, the components represented with like reference symbols as those in FIG. 2 denote the same components, and the basic configuration is similar to the first embodiment shown in FIG. 2. Note that, contrary to the shape of the conductive member 4 shown as square in FIG. 2, the conductive member is ring-shaped in this embodiment. However, it should be noted that the shape of the conductive member is not limited to this, and any other shapes including square and round may be used as described above. Provided, since lowering the resistance value makes the eddy current higher, it is preferable to make the conductive member square in this sense.

In this embodiment, one of the first loop electrode lines 1 selected by the switching section 6 is driven by means of the constant-current drive amplifier 5 having an output impedance of approximately zero. With this configuration, no interference is caused with each other even if the current amplifier 7 having an impedance of approximately zero is connected to a plurality of second loop electrode lines 2 because interference due to current flowing into the second loop electrode lines 2 at the detection side is not caused. Accordingly, concurrent connecting of a plurality of current amplifiers to the second loop electrode lines 2 at the detection side is enabled, thus plural detections at the same time are enabled. The highest speed operation of the current amplifier 7 is attained when the current amplifier is connected to the respective second loop electrode lines 2. However, the present invention is not limited to such a configuration, and plural detections at the same time may be carried out with a plurality of current amplifiers 7, the number of those which is less than the number of the second loop electrode lines 2, for example, a half of the number thereof as shown in FIG. 3.

On the other hand, it is also possible to drive the first loop electrode lines at the drive side with different waveforms. Even if a current amplifier 7 having an input impedance of approximately limitless is connected to the second loop electrode lines 2 at the detection side, it is possible to disregard interference to the respective first loop electrode lines 1 to which the second loop electrode lines 2 intersect when a constant-current drive amplifier 5 having an output impedance of approximately zero is used for the constant-current drive amplifier that drives the first loop electrode lines 1. Hence, a plurality of constant-current drive amplifiers 5 can be connected concurrently to the first loop electrode lines 1 at the drive side, and therefore, it is possible to drive the plurality of constant-current drive amplifiers at the same time. Highest speed operation of the constant-current drive amplifiers 5 can be attained when they are connected to the respective first loop electrode lines 1. However, the present invention is not limited to such a configuration, and plural detections at the same time may be carried out with a plurality of constant-current drive current amplifiers 5, the number of those which is less than the number of the first loop electrode lines 2, for example, a half of the number thereof as shown in FIG. 3.

Though the example wherein a plurality of loop electrode lines at the drive side are driven concurrently and a plurality of loop electrode lines at the detection side are also driven concurrently is given in the example shown in FIG. 3, the present invention is not limited to such a configuration, and the present invention may be configured in such an example that only the loop electrode lines at the drive side or the loop electrode lines at the detection side are driven concurrently. Note that high speed operation can be realized in either example.

When a plurality of loop electrode lines are driven, the present invention is configured such that the loop electrode lines to be driven concurrently are driven by oscillators each having a different waveform so that the loop electrode lines applied with pressure there on can be detected. At the detection side, it is configured such that a filter 15 capable of separating only the corresponding waveform is used to perform the detection. In order to obtain said different waveform, the drive frequency may be changed to render the waveforms different, respectively, or any other means, such as modulation and spectrum diffusion, by which the respective loop electrode lines are discriminated, may be used.

The oscillator and the filters described above may be realized in an analog circuit, respectively, or they can be naturally realized in a digital circuit by means of DSP comprising an A/D converter and a D/A converter.

As described above, with the pressure distribution detection device according to the present invention, pressure distribution can be detected at a greatly high speed because concurrent driving of plural electrode lines and concurrent detection with plural electrode lines can be carried out. Therefore, for example, changes in load distribution of legs at landing following to jumping can be detected at a high speed.

Now, the third embodiment of the pressure distribution detection device according to the present invention will be explained with reference to FIG. 4. In this drawing, components represented by like reference symbols as those shown in FIG. 2 denote the same components. In the embodiments described above, examples in which the conductive members 4 are provided onto the intersections formed by the first loop electrode lines 1 and the second electrode lines 2 are explained. Contrary to those examples, the conductive members are provided in the form of strip along the second loop electrode lines 2 at the detection side in this embodiment. When the conductive members 4 are provided along the second loop electrode lines 2 at the detection side, induction current is generated at the width of the strips from the intersecting first loop electrode lines 1 at the drive side. The induction current becomes current flowing in the direction of counteracting magnetic field, namely the inverse direction to the current direction of the first loop electrode lines. However, since the conductive members are strip-shaped, the induction current becomes eddy current, and current is generated in the second loop electrode lines 2 at the detection side in the direction of counteracting the eddy current. Accordingly, in this embodiment, like the embodiments as described above, moving and changes of the conductive members 4 caused by pressing the conductive members 4 can be detected with use of current.

The configuration of the conductive members as described above makes the manufacturing of the pressure distribution detection device easier since accurate positioning onto the intersections is not required for the formation of the conductive members. Furthermore, since there is no need to watch the position displacement in the lateral direction, it becomes possible to curve the pressure distribution detection surface itself. FIG. 5 is a cross section cut along the broken line A-A in FIG. 4, when a pressure distribution detection device, in which the conductive members formed into strip shape as explained in the third embodiment are formed, is formed on a flexible substrate, for example, made of polyimide or the like and then curved. Even if the pressure distribution detection device is curved as described above, the effect of the position displacement on the intersection can be disregarded. Therefore, when the pressure distribution detection device according to the present invention is applied for coatings for cables and the like, it is possible to detect such an event, for example, that cables are stepped and subjected to forced pressure, which makes possible to avoid an event of cable breakdown and the like in advance. Even though cables are broken, it is possible to easily detect the broken point of the cable Now, the fourth embodiment of the pressure distribution detection device according to the present invention will be explained with reference to FIG. 6. In this drawing, components represented by like reference symbols as those in FIG. 2 denote like components. In the fourth embodiment, the pressure distribution detection device according to the present invention is applied for a touch panel provided with display function. In this embodiment, the elastic body 3 and the conductive member 4 are composed of a material having permeability. And, a display device 20 is provided in between a layer composed of the loop electrode lines and the elastic body. Note that, an LCD for tablet PC, an LCD made thin and intended so as not to interfere electromagnetic induction, and the like may be used for the display device 20. In the pressure distribution detection device according to this invention, since no wiring is required for the conductive members being a movable component, it is possible to easily form the elastic body 3 and the conductive members 4 on the surface of the display device 20. With such a configuration, a touch panel provided with display function capable of detecting pressure distribution can be realized. In addition, when a flexible display using organic EL or the like as the display device, it is naturally possible to curve it as shown in FIG. 5.

It should be noted that the present invention is not limited to the illustrated examples described above, and it is naturally possible to apply various modifications to the present invention within the scope that does not depart from the subject matter of the present invention.

EXPLANATION OF REFERENCE SYMBOLS

Figure 1:
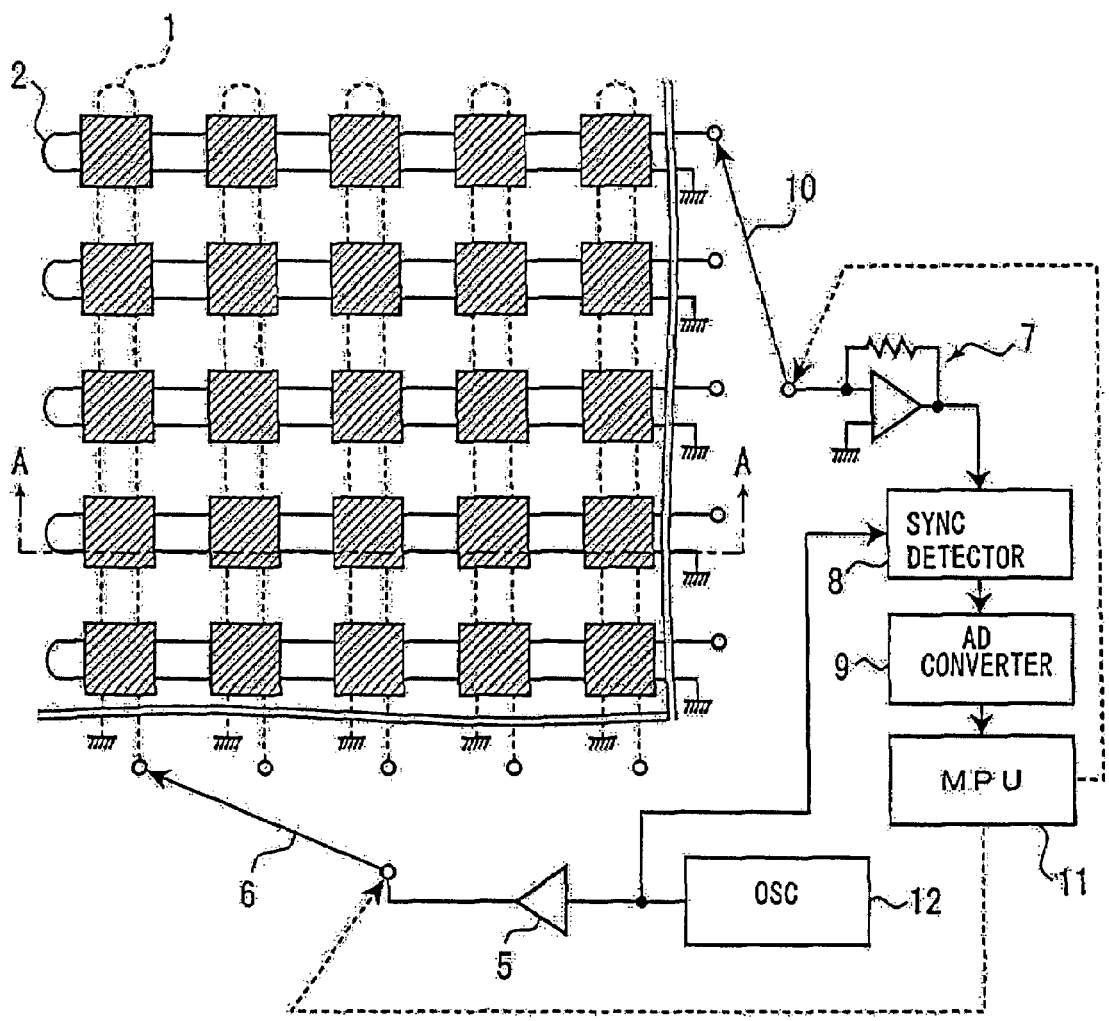
FIG. 1 is a schematic top view for illustrating the first embodiment of the pressure distribution detection device according to the present invention.
Figure 2:
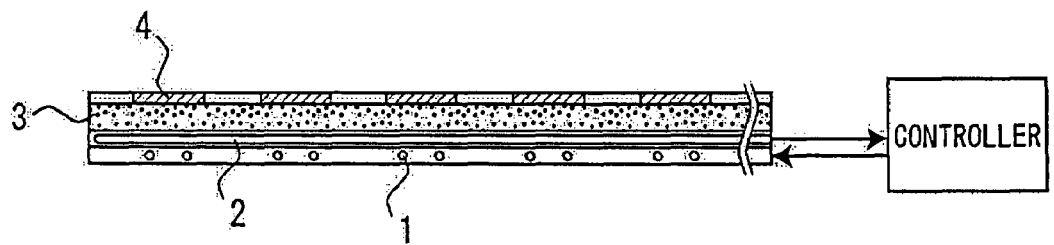
FIG. 2 is a schematic lateral cross section of the pressure distribution detection device shown in FIG. 1.
Figure 3:
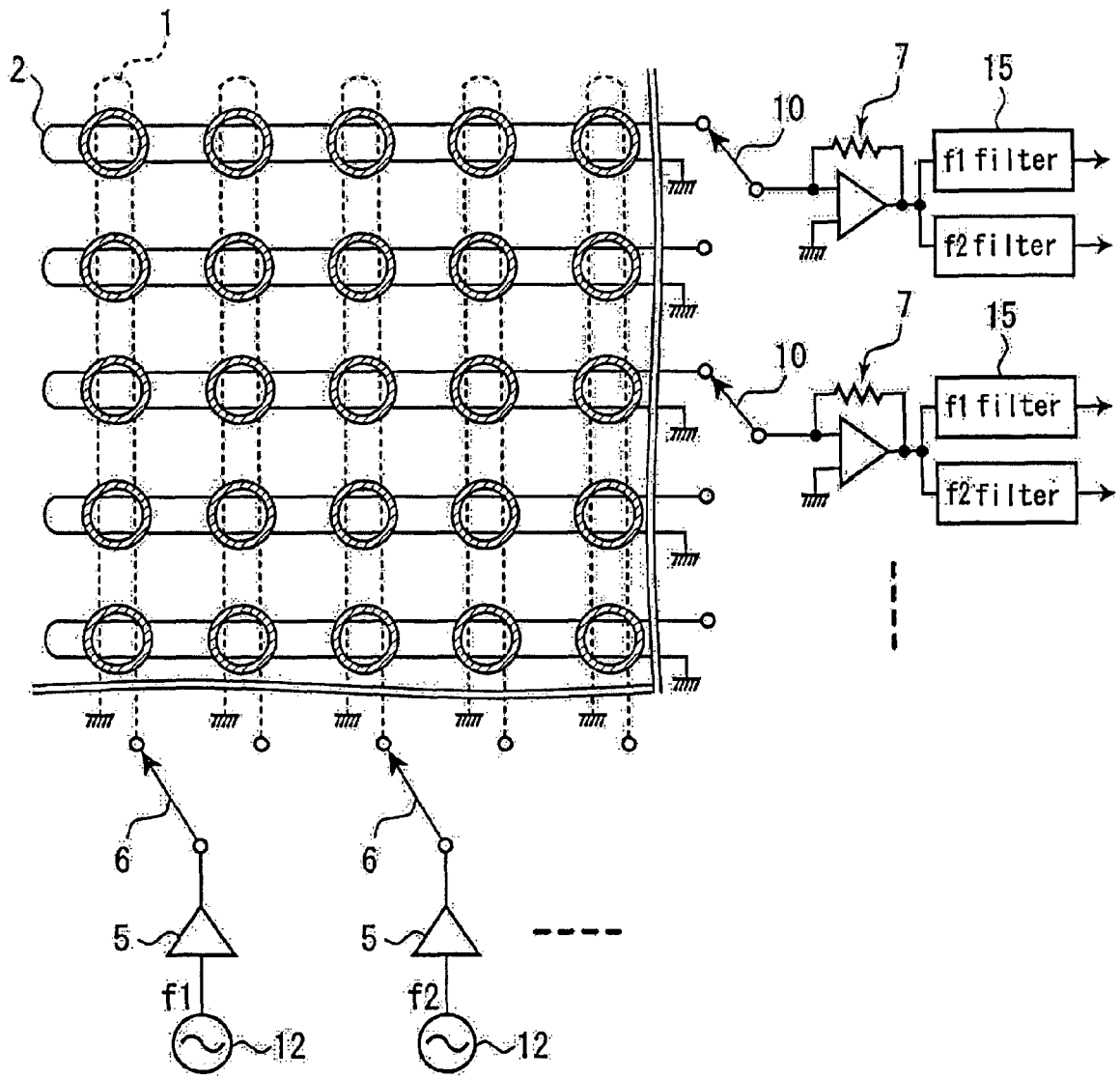
FIG. 3 is a schematic top view for illustrating the second embodiment of the pressure distribution device according to the present invention.
Figure 4:
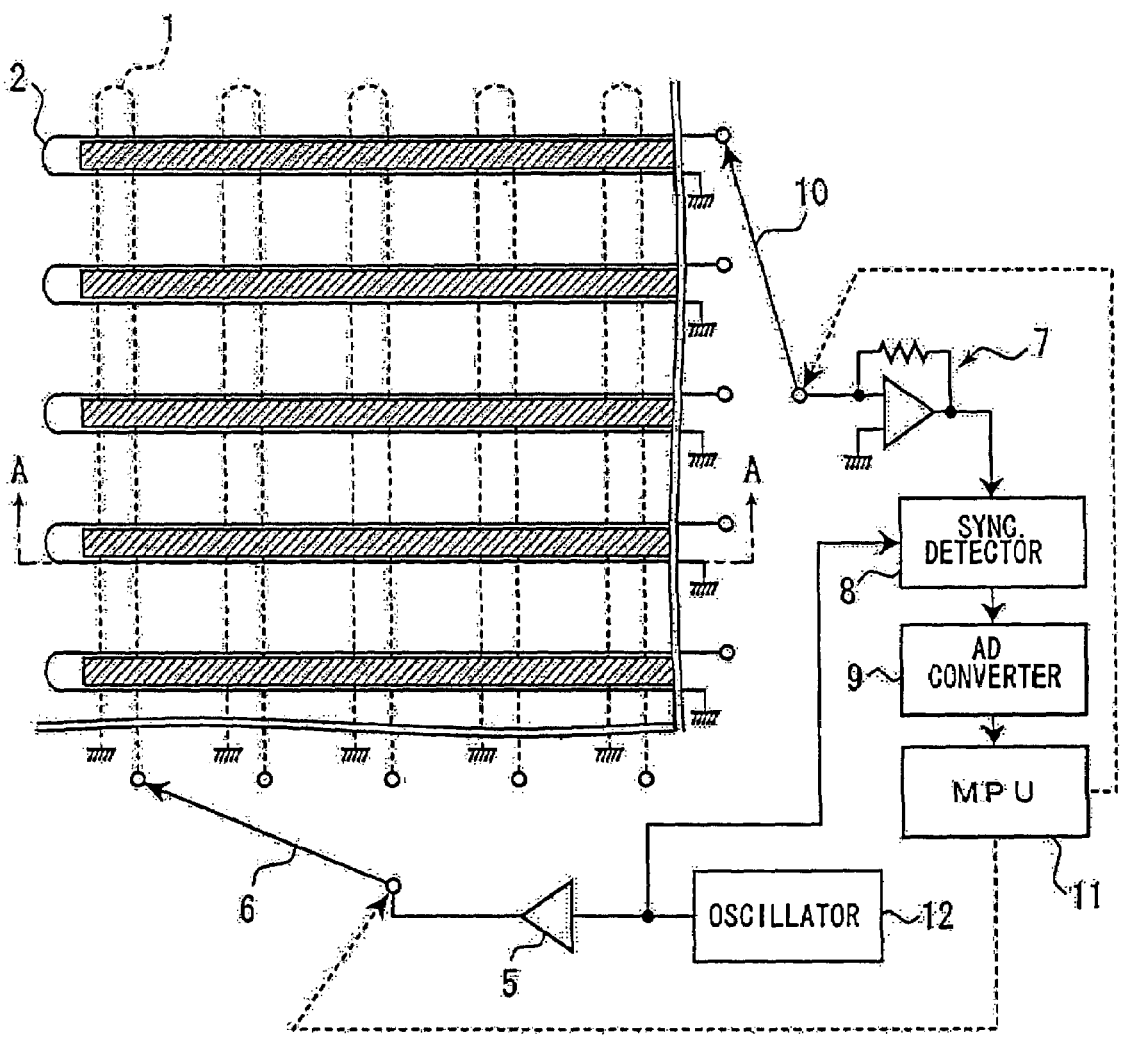
FIG. 4 is a schematic top view for illustrating the third embodiment of the pressure distribution detection device according to the present invention.
Figure 5:
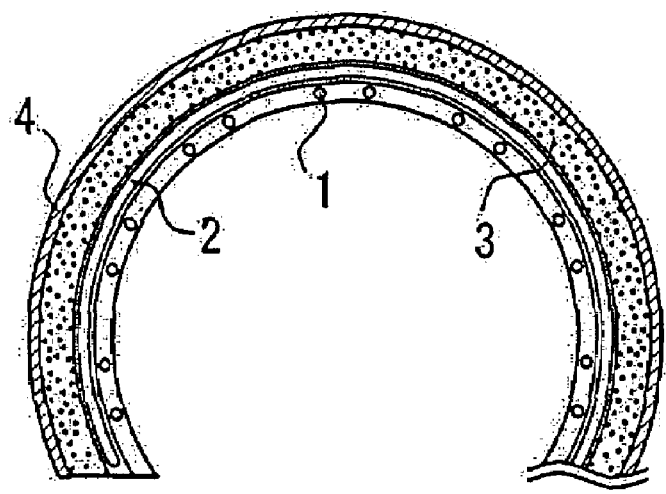
FIG. 5 is a schematic lateral cross section of the pressure distribution detection device shown in FIG. 4 when it is curved.
Figure 6:
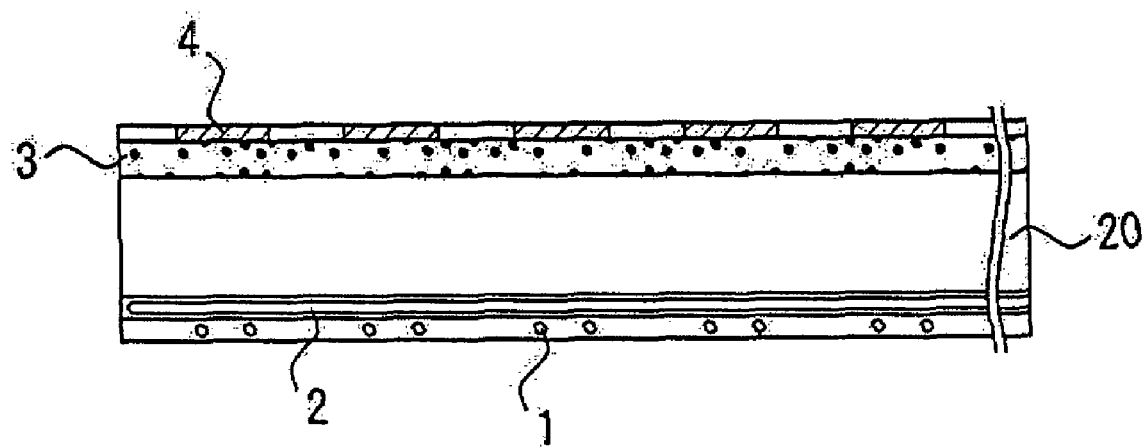
FIG. 6 is a schematic cross section for illustrating the fourth embodiment of the pressure distribution detection device according to the present invention.

1: First loop electrode line
2: Second loop electrode line
3: Elastic body
4: Conductive member
5: Constant-current drive amplifier
6: Switching section
7: Current amplifier
8: Synchronous detector
9: AD converter
10: Switching section
12: Oscillator
15: Filter
20: Display device

What is claimed is:

1. A pressure distribution detection device for detecting distribution of applied pressure comprising;
    first loop electrode line group consisting of a plurality of loop electrode lines arranged in parallel within a first surface,
    second loop electrode line group consisting of a plurality of loop electrode lines arranged in parallel in the direction orthogonal to the first loop electrode line group within a second surface, which is formed onto the first surface in parallel thereto at a fixed distance,
    an elastic body provided on a second surface,
    conductive members movably provided at least on the intersections formed by the first loop electrode lines and the second loop electrode lines, respectively, via the elastic body, and
    a controller for driving one of the first loop electrode line group and the second loop electrode line group and for detecting signals generated by electromagnetic coupling from the other.

2. A pressure distribution detection device according to claim 1, wherein the conductive members are provided on the intersections formed by the first loop electrode lines and the second loop electrode lines, respectively.

3. A pressure distribution detection device according to claim 1, wherein the conductive member is square-shaped, round-shaped, or ring-shaped.

4. A pressure distribution detection device according to claim 1, wherein the conductive members are provided in the form of strip along the respective loop electrode lines of the loop electrode line group at the detection side among the first and second loop electrode line groups.

5. A pressure distribution detection device according to claim 1, wherein the controller contains an oscillator and a constant-current drive amplifier having an output impedance of approximately zero at the drive side.

6. A pressure distribution detection device according to claim 5, wherein said one or more constant-current drive amplifiers are provided and are connected to one or more loop electrode lines of the loop electrode line groups at the drive side among the first and second loop electrode line groups.

7. A pressure distribution detection device according to claim 1, wherein the controller contains a current amplifier having an input impedance of approximately zero at the detection side.

8. A pressure distribution detection device according to claim 7, wherein said one or more current amplifiers are provided and are connected to one or more loop electrode lines of the loop electrode line groups at the detection side among the first and second loop electrode line groups.

9. A pressure distribution detection device according to claim 1, wherein the elastic body comprises a sheet of silicon sponge.

10. A pressure distribution detection device according to claim 1, wherein the device further contains a magnetic shield member to be provided under the first surface.

11. A pressure distribution detection device according to claim 1, wherein the device further contains a soft magnetic shield member to be provided onto the conductive members.

12. A pressure distribution detection device according to claim 1, wherein the respective loop electrode lines other than the loop electrode lines to those which the controller is connected are opened.

13. A pressure distribution detection device according to claim 1, wherein the device further contains a switching section for connecting the controller to one or more loop electrode lines in turn.

14. A pressure distribution detection device according to claim 1, wherein the controller drives 2 or more loop electrode lines with different waveforms.

15. A pressure distribution detection device according to claim 14, wherein the controller contains a plurality of filter circuits for separating the detected waveforms.

16. A pressure distribution detection device according to claim 1, wherein the first and second surfaces are formed into curved surfaces.

17. A pressure distribution detection device according to claim 1, wherein the elastic body and the conductive members are permeable, and the device contains a display device in between the second loop electrode line group and the elastic body.

18. A pressure distribution detection device according to claim 1, wherein the signals are generated by indirectly electromagnetically coupling via the conductive members from the other of the first loop electrode line group and the second loop electrode line group.

* * * * *

UNITED STATES PATENT AND TRADEMARK OFFICE
CERTIFICATE OF CORRECTION

PATENT NO. : 7,703,342 B2  Page 1 of 1
APPLICATION NO. : 11/887556
DATED : April 27, 2010
INVENTOR(S) : Yasuji Ogawa It is certified that error appears in the above-identified patent and that said Letters Patent is hereby corrected as shown below:

Column 1, line 8 – Replace "POT" with --PCT--

Column 1, line 28 – Replace "mode" with --modes--

Column 1, Line 55 – After "Laid-open" Add --No. 62-31865--

Column 8, Line 61 – After "cable" add --.--

Signed and Sealed this
Twenty-fifth Day of October, 2011

David J. Kappos
*Director of the United States Patent and Trademark Office*